United States Patent
Helle

[11] Patent Number: 5,342,697
[45] Date of Patent: Aug. 30, 1994

[54] CONNECTED ARTICLES

[76] Inventor: Richard D. Helle, 11 Bear Hill Rd., Rutland, Mass. 01543

[21] Appl. No.: 124,576

[22] Filed: Sep. 20, 1993

Related U.S. Application Data

[63] Continuation of Ser. No. 762,390, Sep. 19, 1991, abandoned.

[51] Int. Cl.⁵ ................................................ B22F 5/00
[52] U.S. Cl. ............................ 428/547; 277/207 R; 277/236; 277/DIG. 10
[58] Field of Search .................... 428/547; 16/2; 29/283.5; 277/207 R, 207 A, 236, DIG. 10, 189, 136

[56] References Cited

U.S. PATENT DOCUMENTS

| | | | |
|---|---|---|---|
| 2,869,947 | 1/1959 | Kemper | 309/44 |
| 3,069,757 | 12/1962 | Beggs et al. | 29/182.1 |
| 3,485,331 | 12/1969 | Volker et al. | 192/107 |
| 3,580,106 | 5/1971 | Wiehl | 74/579 |
| 3,790,374 | 2/1974 | Dedek | 75/208 R |
| 3,844,011 | 10/1974 | Davies | 29/182.3 |
| 3,848,312 | 11/1974 | Kirkham | 29/160.6 |
| 4,663,241 | 5/1987 | Doherty et al. | 428/547 |

Primary Examiner—Donald P. Walsh
Assistant Examiner—Chrisman D. Carroll
Attorney, Agent, or Firm—Hale and Dorr

[57] ABSTRACT

An article and method of making it of powdered metal, the article being in the nature of a bushing having a main body portion of usual density and outer protrusions of lesser density for a squeezed interference fit in the part to which the article is to be combined.

10 Claims, 2 Drawing Sheets

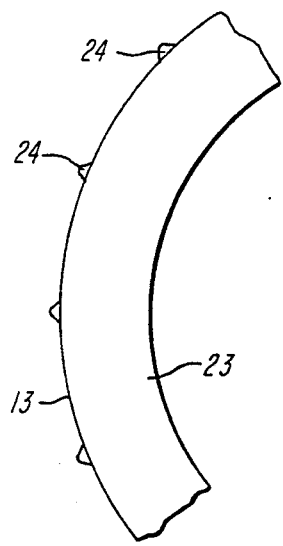
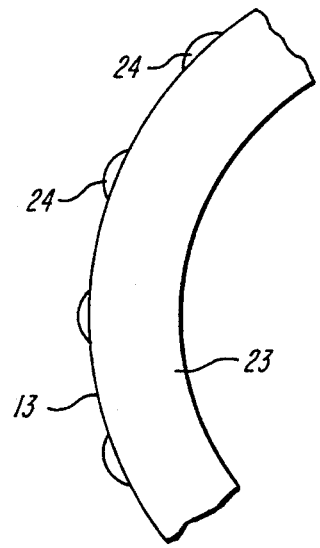
FIG. 6  FIG. 7
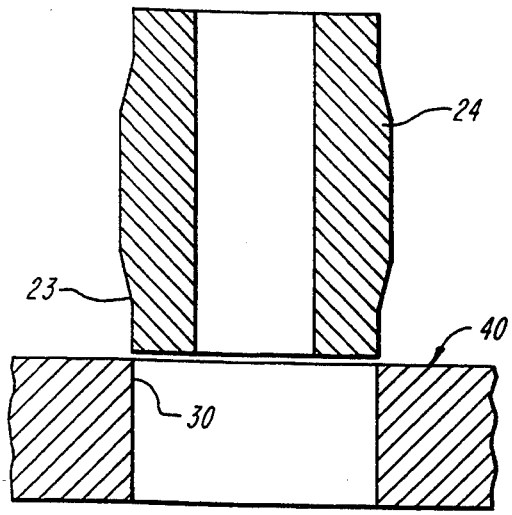
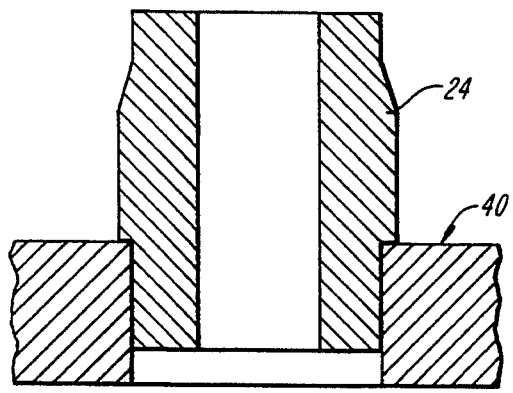
FIG. 8  FIG. 9

CONNECTED ARTICLES

This a continuation of copending application Ser. No. 07/762,390 filed on Sep. 19, 1991, now abandoned.

BACKGROUND OF THE INVENTION

The connection of small articles, such as bushings, grommets, washers, etc., to a larger article is improved by better holding power. The present invention is in the field of pressed metal, but other kinds of articles may come within purview of this invention. In the present case it is particularly adapted to grommets or inserts of any kind which are forced into holes adapted to receive them and hold them by friction without any further mechanical interlock between the interfaces surfaces of the articles and the objects to which they are attached.

SUMMARY OF THE INVENTION

In the present case, pressed metal molds may be utilized without great change with one small exception, which will become apparent as the definition of the present invention proceeds. In the die part forming the article, openings are provided to lessen the pressure on the powdered metal at certain portions of the article being made. These parts are of less density than the article itself. When the grommet or washer is inserted in a hole that fits the article, certain portions thereof have a tendency to crumble under pressure at the interface between the members that are under consideration. This crumbling effect substantially seals the parts together.

The present application is illustrated as applied to a bushing designed to be joined to another metallic article, such as the flat metallic rib of a modern engine gasket. The parts are secured together by means of "interference" and the interference is derived from the components of the parts. That is, the grommet, bushing, etc. is made substantially to the same dimensions but is provided with protuberances on the exterior thereof so that when forced together, these protuberances, or part of them, are apt to crumble and thereby seal the parts together. It will be seen that this will secure the parts better than the ordinary interface friction fit of bushing and object to which it is applied.

The protrusions formed extend all the way to the top edge of the bushing. The material at the top end of the protrusion is improperly compacted due to the non-capture aspect of the top punch; and, this material breaks away quite easily in a subsequent tumble deburring of the bushing. The result is a bushing as shown in FIGS. 5-7, wherein each protrusion 24 is tapered at both ends.

This is done in a machine of known description with a small variation therein. The ordinary powder metal is achieved by means of a die, an upper punch, a lower punch, cooperating together with powdered metal inserted between the interior of the die and the two cooperating ends of the punches which approach each other, but of course do not touch, in order to form a wafer like object there between, or in some cases a ring, of the powdered metal.

The invention in the present case comprises merely forming apertures or passages in the die itself which do not have any complimentary part on the punches, and thereby they do not have the same high pressure applied to them during the forming operation. The portions of less density are parallel to the axis of punches and forming ribs which are of lower density than the article itself being formed in the die, and therefore being subject to crumbling to a small extent when forced into an opening in an element such as the engine gasket referred to above.

BRIEF DESCRIPTION OF THE DRAWINGS

FIGS. 5, 6, and 7 are views showing in cut away form, the bushing having ribs of various shapes.

FIGS. 8 and 9 are views showing, in cut away form, the bushing fitted in an opening in an engine gasket.

PREFERRED EMBODIMENT OF THE INVENTION

Figure 1:
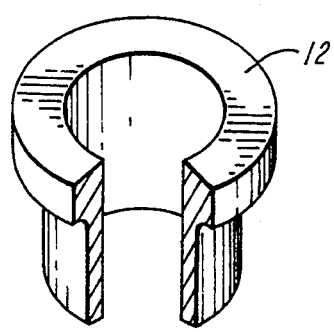
FIG. 1 is a perspective and cut away illustration of a common upper punch.
Figure 2:
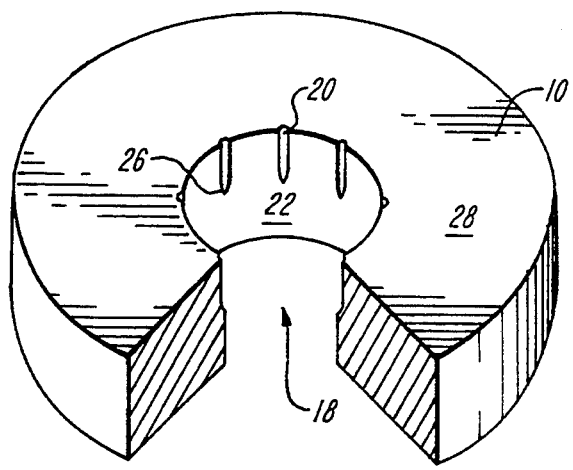
FIG. 2 is the same type of view of the die of the present invention.
Figure 3:
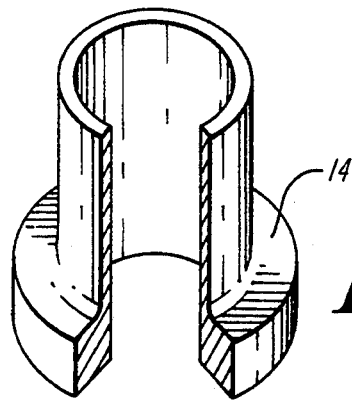
FIG. 3 is a similar view of the lower punch.
Figure 4:
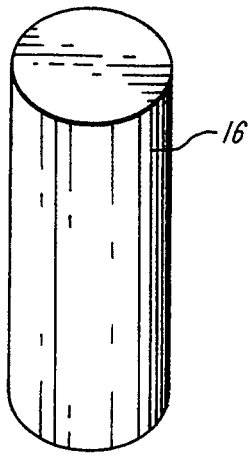
FIG. 4 is a view of the core.
Figure 5:
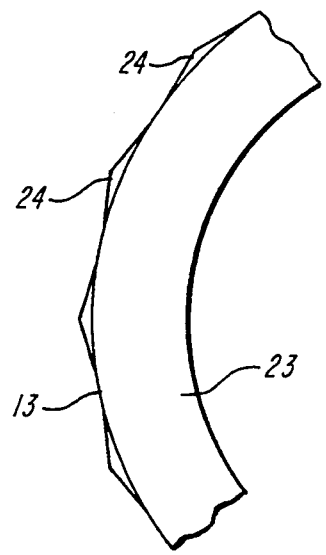

FIGS. 1, 2, 3 and 4 essentially show the entire mechanism for forming the bushing or similar article of manufacture. The reference 12 indicates the die, and 23 in FIGS. 5, 6 and 7 represents the upper punch. The lower punch is indicated at 14, FIG. 3, and the core is shown in FIG. 4 and is labeled 16. Assuming that in the present instance a bushing is being formed, it is shown at 23 and it has a plurality of elongated ridges or protrusions axially located on the exterior or outside diameter thereof as at 24. These protrusions are shown at 24 and FIGS. 5, 6, and 7, and are positioned along the outer surface of the bushing itself.

The bushing formed is symmetrical, does not have to be oriented for automated assembly, and is more securely held in its position of use.

The method of forming the bushing 23 in accordance with the present invention is accomplished by the use of conventional powdered metal compacting components which comprise the die 10, the top punch 12, the bottom punch 14 and the core rod 16. The die 10 has a bore 18 which has the same diameter as the outer diameter of the bushing and a plurality of grooves 20 in the inner surface 22 of the die which defines the bore 18. The grooves 20 are for forming the protrusions 24. Each groove 20 begins with a tapered end 26 near the center of the die 10 and extends through the upper surface 28 of the die. During a compacting operation, the bottom punch is moved to the bottom of the die 10. The bore 18 is filled with powdered metal and the top and bottom punches are brought together to compact the powder, thereby forming the bushing 23. FIGS. 5, 6 and 7 show fragments of the bushing with designs of the cross-sections of slightly different protrusions 24.

Since grooves 20 are open at their upper ends the pressure of compacting is less on the powdered metal in the grooves, and the protrusions 24 are less dense than the main body portions of the bushings or whatever other article may be formed.

In actual operation there is little or no powder that escapes through the openings at the tops of the grooves; it is simply that the protrusions are weaker and more subject to an effect of slightly crumbling when used to fit an aperture for interference fit.

The protrusions 24 extend parallel with the central longitudinal axis of the bushing. As shown in FIG. 8, each end of the protrusions 24 of bushing 23 may be tapered to form a "lead" for facilitating the insertion of the bushing into the aperture 30 of the gasket or other part 40 which is to be combined with the bushing.

As will be seen, the bushing 23 is made to substantially the same diameter as aperture 30. However, as shown in FIGS. 8 and 9, protrubences 24 on the exterior 13 of the bushing 23 are such that they are apt to crumble (as shown in FIG. 9) when the bushing is forced into aperture 30, and thereby hold the bushing 23 and gasket 40 together.

The density of the protuberances can be further varied by modifying the size and shape and thereby allowing more or less powder into these areas before the compaction cycle, or by extending the grooves 24 the full length of the die, and either partially or fully closing the openings at both top and bottom.

I claim:

1. In combination,
    a first article of compressed powder metal having a main body portion having an exterior surface and a plurality of protuberances projecting outwardly from said exterior surface, said main body being of greater density than said protuberances; and,
    a second article having an aperture therein arranged to receive said first article, the dimensions of said aperture being substantially the same as that of said main body of said first article,
    said first article being inserted into said aperture such that said protuberances form an interference fit with said aperture.

2. The combination of claim 1 wherein said first article has a central axis and said protuberances extend generally parallel to said axis.

3. The combination of claim 2 wherein said exterior surface is generally circular in a plane perpendicular to said central axis, and said protuberances are elongated and circumferentially spaced.

4. The combination of claim 3 wherein at least one end of each of protuberances is tapered.

5. The combination of claim 4 wherein both ends of each of said protuberances are tapered.

6. The method of connecting first and second articles together, said method comprising the steps of:
    forming a said first article which has a main body portion having a central longitudinal axis, an exterior peripheral surface, and a plurality of elongated protuberances on said peripheral surface by providing a predetermined amount of metal powder and compressing the powder at different pressures such that the main body portion is of greater density than the protuberances;
    providing a said second article having an aperture therein the dimensions of which are substantially the same as that of the main body portion of the first article; and,
    forcing the said first article into the aperture of the said second article such that the protuberances form an interference fit with the aperture.

7. The method of claim 6 wherein at least a part of said protuberances crumble when said first article is forced into said aperture.

8. The method of claim 6 wherein a higher pressure forms the main body portion of the article and a lower pressure forms the protuberances.

9. The method of claim 8 wherein the higher pressure acts on powder that is wholly enclosed in a die and the lower pressure acts on powder that is located in a die portion that has an escape port.

10. The method of claim 6 comprising using a die having a circular inner surface which defines a bore having open opposite ends and an axis, and a plurality of elongated, parallel, space grooves in said inner surface which are parallel to the axis of said bore, said die having a flat upper surface normal to said axis of said bore, each of said grooves being open through said flat upper surface, placing a predetermined amount of uniform metal powder within said bore, pressing said metal powder within said bore from the opposite ends of said bore by using a pair of punches which enter said bore through said opposite ends and compress the powder within said bore to form said main body portion of a uniform density and to form said protuberances within said grooves.

* * * * *